May 15, 1956 — J. K. TAGGART ET AL — 2,745,607
SPINNING TYPE FISHING REEL
Filed April 9, 1954 — 2 Sheets-Sheet 1
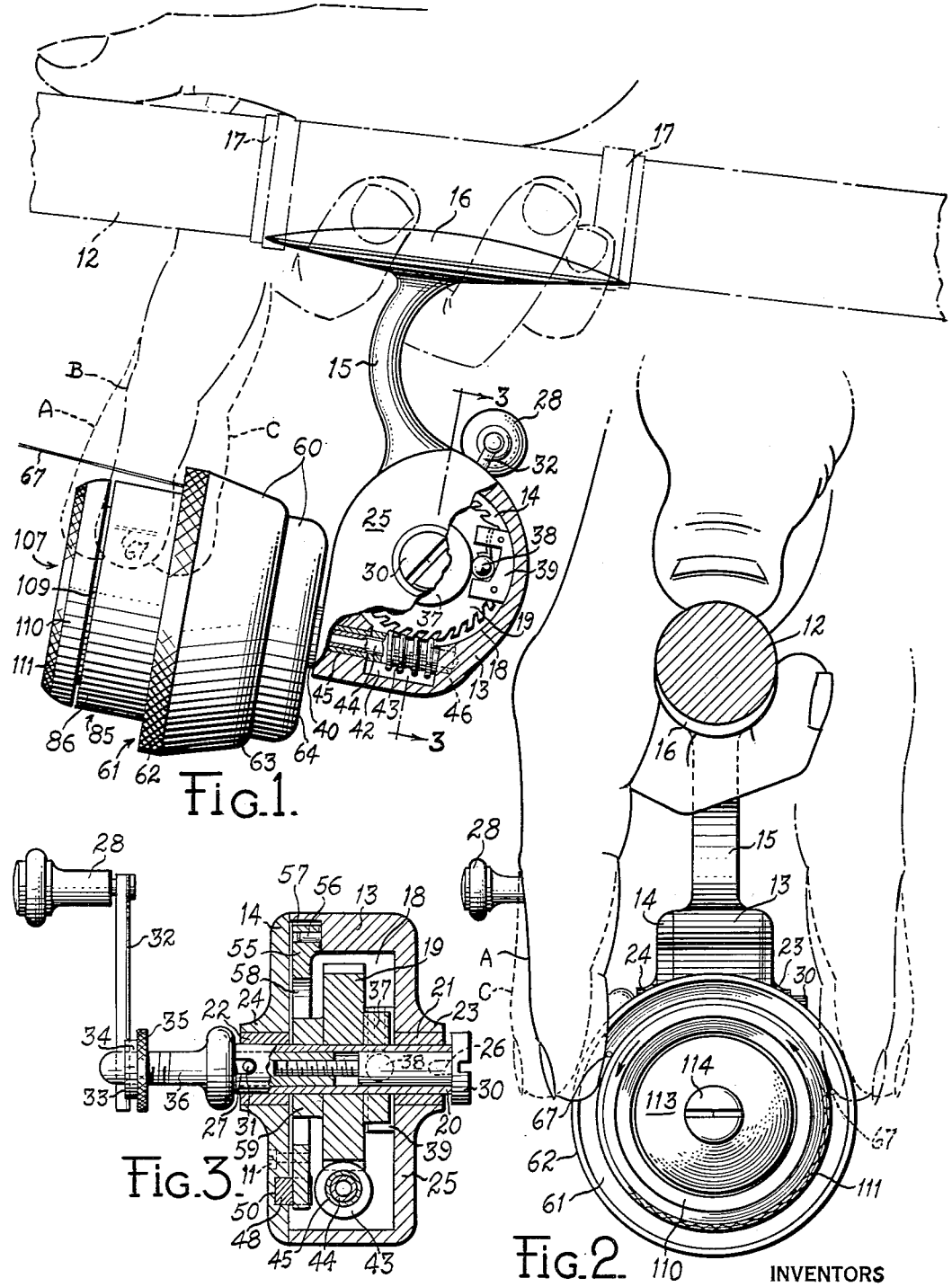
INVENTORS
JOHN K. TAGGART
JAMES C. TAGGART
BY George A. Ordway
ATTORNEY

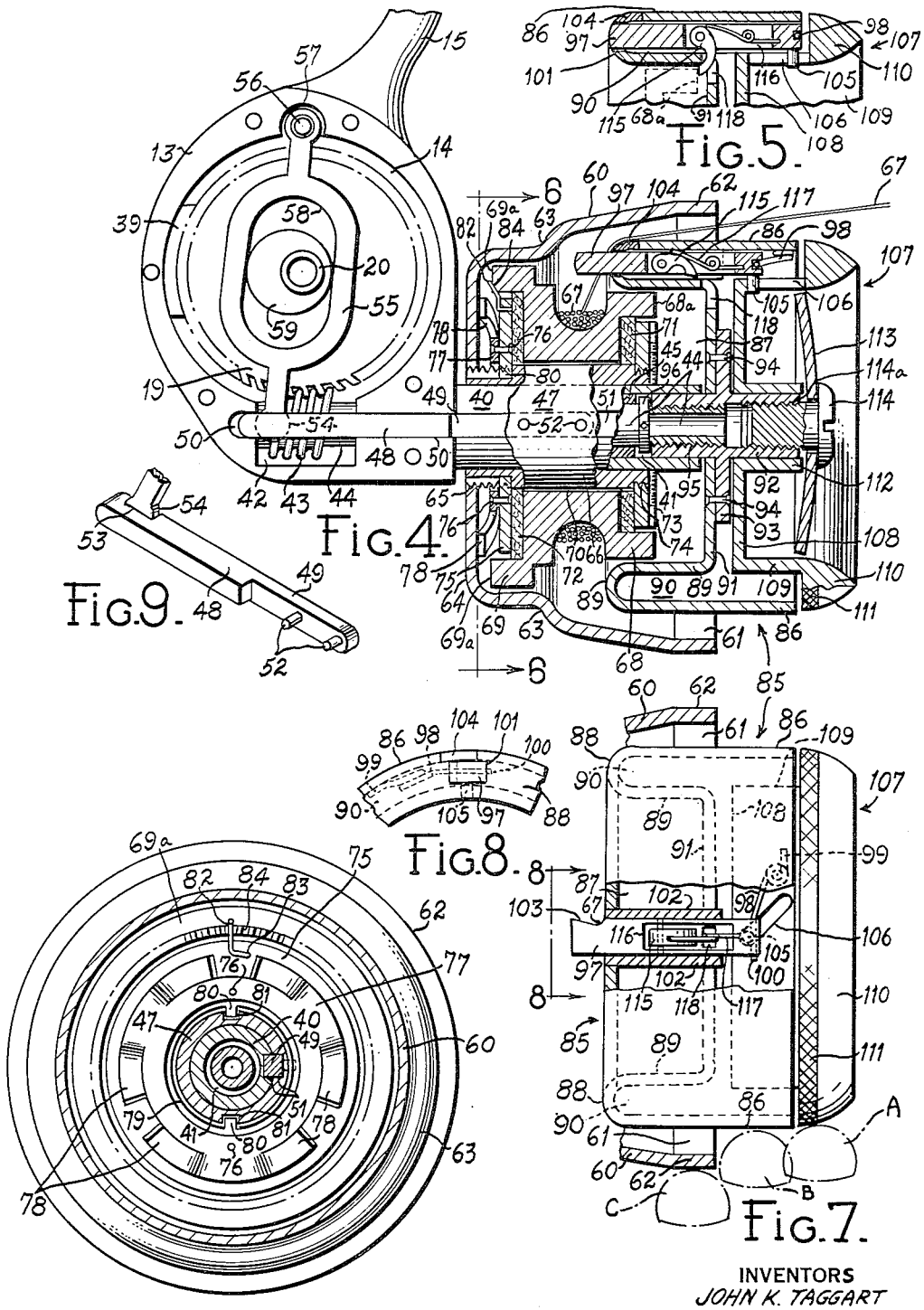

United States Patent Office 2,745,607
Patented May 15, 1956

2,745,607

SPINNING TYPE FISHING REEL

John K. Taggart and James C. Taggart, Indianapolis, Ind.

Application April 9, 1954, Serial No. 422,026

15 Claims. (Cl. 242—84.4)

This invention relates to improvements in fishing reels and more particularly to the type commonly known as "spinning reels."

In several aspects the present invention provides certain improvements upon the spinning reel which is disclosed in our co-pending U. S. Application Serial No. 315,276, filed October 17, 1952, now Patent No. 2,711,292.

An object of the present invention is to provide a spinning reel wherein the control for releasing the line in casting, the feathering of the line during the cast and the regulation of frictional drag upon the spool may, each and all of them, be selectively accomplished by slight arcuate shifting of the tip of a single finger of the same hand by which the reel and rod is grasped and wherein the angler has complete freedom of choice as to which hand he shall use in grasping the rod and reel and effecting such control.

Another object is to provide a spinning reel wherein the line is picked up automatically and substantially instantly upon the commencement of retrieve and is released for casting simply and solely by a single fingertip manipulation of a conveniently located, readily accessible, and universally operable line-releasing control member.

A further object is to provide a protective housing for the reel spool which is so mounted in operative association therewith and with respect to a brake mechanism also associated with the spool that the housing acts additionally as a fingertip controllable adjustment means readily and conveniently accessible for controlling the degree of friction applied to the spool by the brake mechanism.

Other objects and advantages of the invention will be apparent as the description proceeds in conjunction with the accompanying drawings, and will be more particularly pointed out in the claims which follow.

In the drawings:

Fig. 1 is a left side elevation (partially sectioned for clearness) of the improved reel as applied to a fishing rod and illustrates diagrammatically in dot and dash lines the fingertip control afforded by the arrangement and construction of the reel, the right hand being shown for illustrative purposes only;

Fig. 2 is a front elevation of the reel illustrating in full lines the fingertip control by the index finger of the right hand and in broken lines suggesting the corresponding left-handed fingertip control that is afforded by the arrangement and construction of the reel components;

Fig. 3 is an enlarged transverse cross section of the gear case taken substantially along the lines 3—3 of Fig. 1;

Fig. 4 is an enlarged right side elevation partly in section and with the side cover plate of the gear case and the crank removed, certain parts being broken away for clearness;

Fig. 5 is a detailed sectional view of a portion of Fig. 4 but showing a line pickup member thereof in retracted or latched position;

Fig. 6 is a transverse sectional elevation taken substantially along the line 6—6 of Fig. 4;

Fig. 7 is a top plan view of a flyer component and its associated manipulative control member, certain portions being broken away for clearness;

Fig. 8 is a detailed fragmental elevation taken along the line 8—8 of Fig. 7; and Fig. 9 is a detailed perspective view of a combination key-link component of the reel.

Referring to Fig. 1 a fishing rod is shown by dot and dash lines at 12 to illustrate the mounting of our improved reel thereon. The reel includes a gear case 13 of rectangular cross section (see Fig. 3) having a removable side plate 14. Plate 14 is secured to case 13 by screws such as 11. A curved upwardly extending shank 15 formed integrally with the upper end of the gear case merges into an elongate concaved tang 16 which is adapted to seat snugly against the surface of rod 12 and be secured thereon as by means of tang-engaging ferrules such as 17 or the like. Centrally of case 13 there is provided a circular opening 18 extending transversely through the case and adapted to receive a helically toothed, worm driving gear 19 fixed upon a horizontally disposed, tubular crank shaft 20. Shaft 20 also extends transversely through case 13 and is journalled at its opposite ends in suitable bearings 21 and 22 fixed in outwardly projecting bosses 23 and 24 provided on a side plate 25 formed integrally with case 13 and on side plate 14, respectively.

The opposite ends of shaft 20 extend outwardly slightly beyond the outer surfaces of bosses 23 and 24 and each end is provided with a pair of oppositely disposed slots 26 and 27. A crank 28 having a tubular spindle 36 is arranged to be slid inwardly from either side of shaft 20 and a screw 30 inserted from the opposite side is threaded interiorly into the inner end of spindle 27 to secure crank 28 in its mounted position. The opposed ends of a pin 31 fixed transversely in spindle 36 articulate within either pair of slots 26 or 27, as the case may be, to insure a positive driving connection between the crank and shaft 20. The crank arm 32 is formed of round stock and is provided with a recessed flat 33 at its inner end, the flat being adapted to be firmly engaged by a reduced collar 34 of a knurled nut 35 threadably mounted upon the outer end of spindle 36. By backing nut 35 off to withdraw collar 34 from recessed flat 33, arm 32 may be readily turned 180 degrees to rotate the projecting handle of the crank inwardly for storage purposes. The provision for inserting and securing spindle 36 from either side of shaft 20 enables the reel to be readily changed from a right to a left hand reel or for mounting the crank in accordance with the particular preference or dexterity of the angler.

Referring to Figs. 1 and 3, a circular collar 37 suitably affixed to and adjacent gear 19 has its periphery engaged by a spring-pressed ball or roller 38 of an overriding clutch unit 39 affixed to the inner side of sideplate 25 to insure that crank 28 and gear 19 may be rotated in one direction only (namely counterclockwise as viewed in Fig. 1).

A forwardly projecting spool bearing or support 40 (Figs. 4 and 6) of circular cross section is preferably formed integrally with gear case 13. Support 40 is provided with a longitudinally extending bore 41 which extends completely to the rear end of case 20 and communicates intermediate its ends with an enlarged recess 42 provided in the base of the case. Recess 42 receives with clearance a helically toothed worm 43 which meshes with worm gear 19 and is driven thereby. Worm 43 is suitably fixed to a tubular shaft 44 extending longitudinally through bore 41 and journalled for rotation in bearings such as 45 (Fig. 1) press-fittedly secured within the bore at spaced intervals therealong, the rear end of the shaft being journalled in a thrust bearing 46 as shown in Fig. 1.

The readily demountable side plate 14 renders "take down" easy.

A slip sleeve 47 (Figs. 4 and 6) is slidably mounted for longitudinal reciprocation upon support 40 and is keyed thereto against rotation by means of a key-link 48. The rearward end of key-link 48 is somewhat wider than the forward end 49 thereof, the rear end being slidingly fitted in matching and confronting keyways 50 (Figs. 3 and 4) provided in the inner face of side plate 14 and the face of case 13 which is met by such inner face when plate 14 is secured to the case. The relatively narrower forward end 49 of the key fits slidingly into matching and confronting ways 51 provided exteriorly of support 40 along one side thereof and in corresponding position interiorly of the bore of slip sleeve 47. A pair of spaced, outwardly projecting pins 52 on forward end 49 of key-link 48 are arranged to enter within correspondingly spaced pin-receiving openings provided in slip sleeve 47 to connect the sleeve to key-link 48. A slot 53 provided in the rear end of link 48 pivotally embraces a slightly enlarged round 54 formed on the lower end of a yoke 55 pivoted at its upper end upon a pin 56 fixed in a recess 57. Yoke 55 is formed intermediate its ends with an elongate vertical opening 58 in which is received a circular cam 59 eccentrically mounted and fixed to shaft 20 adjacent the left side of gear 19 as viewed in Fig. 3.

By the construction thus far described, rotation of crank 28 drives shaft 44 in rotation and simultaneously, through key-link 48, imparts rectilinear reciprocatory movement to sleeve 47 while the key function of link 48 maintains the sleeve against rotation.

The housing 60 for the spool and for certain other associated components of the reel is preferably formed of light weight material such as aluminum or magnesium alloy and, likewise, the gear case, gears and other parts thus far described may be fabricated of similar materials. Housing 60 is a pressed or otherwise formed shell of generally cup-shaped configuration with a slight angular flare outwardly toward its completely open mouth 61. It preferably terminates adjacent said mouth portion with a flat, relatively narrow band 62 extending parallel to the axis of support 40. Exteriorly, this band may be knurled as shown in Fig. 1 to facilitate adjustment rotation of said housing as will hereinafter appear. The cylindrical flanged portion 60—62 is preferably formed with a strengthening or rigidifying offset as at 63 intermediate its mouth 61 and a vertically disposed back plate 64 into which the offset 63 curvedly merges. Back plate 64 is rotatably and threadably mounted as at 65 upon the rear end of sleeve 47 for reciprocation therewith. The housing serves as an adjustment means for a frictional brake mechanism later to be described, affords a certain minimum degree of guidance to the line during payoff, and concentrically surrounds and protectively encases the spool now to be described.

The spool comprises an annular hub 66 around which the line 67 is received and carried, a forward circular flange 68 and a rearward circular flange 69. Relatively narrow clearance is provided between the periphery of rear flange 69 and the interior of the relatively reduced portion of housing 60 adjacent its back plate and relatively much wider spacing is provided between the periphery of forward flange 68 and the interior of the angular portion of housing 60. Hub 66 has a bore 70 of such diameter with respect to the diameter of sleeve 47 as permits of free rotation of the spool relative to the sleeve. The outer faces 68a and 69a of flanges 68 and 69, are each provided with relatively deep inwardly extending, circular recesses in which are inserted friction washers 71 and 72, respectively, of felt, leather, fibre or other suitable material. The spool is retained in mounted position on sleeve 47 by a ring nut 73 threaded as at 74 upon the forward end of the sleeve. The forward face of nut 73 is preferably serrated to facilitate manual removal whereby the spool may be quickly and easily removed either for replacement by another spool or for replacement of a new line 67 thereon. The spool is normally resiliently urged forward of sleeve 47 into frictional engagement against washer 71 by a brake or drag mechanism now to be described.

The friction brake assembly is shown in Figs. 4 and 6 and comprises a ring plate 75 having secured to the rear face thereof as by flattened rivets 76 or other suitable fastening means a circular, segmental, flat, friction spring 77 having multiple rearwardly projecting pliant leaves 78. Plate 77 has a circular opening 79 centrally thereof that is slipped over sleeve 47 before housing 60 is threaded upon the rear end of sleeve 47 so that the brake assembly lies in interposed relation between the inner surface of housing back plate 64 and friction washer 72, the pliant leaves 78 of spring 77 bearing frictionally against the inner surface of plate 64. The degree of friction applied against the spool is manipulatively controllable by simply rotating housing 60 about sleeve 47 on threads 65 to increase or decrease the frictional pressure applied to the spool. Desirably ring plate 75 is formed with two oppositely disposed lugs 80 projecting inwardly into opening 79 and keyedly engaging correspondingly oppositely disposed slots 81 provided exteriorly of slip sleeve 47 as clearly shown in Fig. 6. In this manner, the brake assembly is held fixed against rotation upon the sleeve.

If desired, a simple and effective click mechanism may be provided to give an audible signal to the angler that the pull on the line as, for instance, upon a strike, or in playing a fish, or hitting a snag, is exceeding the frictional drag imposed upon the spool by the braking action as adjusted by the housing. The click comprises a piece 82 of relatively light, circular, spring wire suitably secured to ring plate 75 as at 83 (Figs. 4 and 6). The outer free end of the wire is bent upwardly and at a slight angle outwardly and engages within the valleys of angularly disposed serrations 84 formed in a continuous annular series at the inner corner of spool flange 69 where its rear face 69a meets the peripheral edge of the washer 72 receiving recess. Sufficient clearance is provided between the rear faces of the rearwardly projecting leaves 78 and the forward face of ring plate 75 to permit spring 82 to vibrate over the serrations and produce the audible click under the circumstances previously mentioned.

The flyer for winding line 67 upon the spool is generally indicated at 85. It is preferably formed of stainless steel or the like and generally of cylindrical shape. The flyer is preferably stamped, spun or pressed from flat stock and may be provided with a reentrant channeled, cylindrical wall flange 86 forming internally thereof a recess 87 of an internal diameter such as will receive with sliding clearance the spool. The cylindrical sidewall 86 merges roundedly as at 88 (Fig. 7) with a reentering cylindrical interior sidewall 89, spaced from outer wall 86 to provide an annular channel 90. Intermediate the ends of cylindrical sidewall 86 and about midway therebetween, interior sidewall 89 merges with a transverse plate or web 91. A tubular cylindrical sleeve 92 (Fig. 4) passes longitudinally through a suitable opening provided centrally in web 91. A flange 93 is formed integrally with and intermediate the ends of sleeve 92 and is riveted as at 94 or otherwise fastened to the web. The inner or rear end of sleeve 92 is interiorly provided as at 95 with a left-hand thread and is adapted to be threaded over corresponding exterior left-hand threads provided adjacent the forward end of shaft 44, a collar 96 fixed exteriorly on shaft 44 acting as an arresting stop for the inner end of sleeve 92 when it is fully threaded upon the shaft as clearly shown in Fig. 4. In this manner, flyer 85 is mounted immediately forwardly of the spool with the recess 87 presented theretoward for reception of the spool therein as the latter moves forwardly with sleeve 47 during a forward stroke of its reciprocation.

A line pickup member 97 preferably of flat, hardened, wear-resistant material is mounted for limited longitudinal sliding movement within channel 90. The rear end of member 97 is rounded conformably to the radius of curvature of the rounded portion 88 of flyer 85. A looped wire spring 98 having one of its ends 99 fixed to the inner surface and adjacent the forward edge of sidewall 86 (see Fig. 7) and its opposite end 100 engaged in a slot provided on the forward end of member 97 normally urges the member rearwardly through an opening 101 (Figs. 5 and 8) provided in the rounded portion 88 of the flyer into a projecting position as shown in Fig. 4. In such projected position member 97 overlies the throat or line-receiving portion of the spool. The member is guided in such sliding movement by a pair of spaced guide members 102 (Fig. 7) disposed with sliding clearance adjacent the opposite sides of member 97 and suitably affixed at their upper and lower edges within channel 90 to the opposed inner surfaces of inner and outer sidewalls 86 and 89. The line-engaging end of member 97 has a slightly curved recess 103 (Fig. 7) for engaging the line. Preferably, an insert 104 of hardened, wear-resisting metal is suitably affixed in rounded portion 88 immediately above and in the plane of recess 103 to prevent wear at that point where the line is drawn thereover during retrieve operations. The forward end of member 97 has fixed thereto a depending pin 105 engaging within an angularly disposed cam slot 106 provided in a manipulative, annular disk or rotor, control member generally indicated at 107 and now to be described.

The annular rotor or control member comprises a plate 108 having a forwardly extending cylindrical flange 109 in which slot 106, just described, is provided. At this forward edge, flange 109 merges into an enlarged forwardly projecting ring 110 of generally ogival transverse cross section. The outer surface of said ring may be knurled as at 111 to provide a non-slip, finger-gripping surface and merges substantially flush with the cylindrical surface of sidewall 86 of flyer 85.

Centrally of plate 108 there is formed integrally therewith a forwardly projecting tubular sleeve 112 (Fig. 4) adapted to be rotatably journalled exteriorly of and upon the forwardly projecting end of sleeve 92. A circular cap plate 113 is secured forwardly of and within the circular flange 109 by means of a screw 114. Screw 114 is threaded as at 114a interiorly into the forwardly projecting end of sleeve 92 to retain plate 113 and annular control member 107 in assembled relation immediately forwardly of flyer 85. The pin and slot connection 105—106 operatively connects annular control member 107 for rotation with flyer 85 and also permits independent relative rotation of member 107 relative to the flyer for a distance commensurate with the length of slot 106. Slot 106 at its left end, as viewed in Figs. 4 and 7, serves as a limiting stop for pin 105 and thereby controls the extent of rearward projective movement which can be imparted to pickup member 97 by spring 98.

Upon slight independent rotation being imparted to control member 107 (in a counter-clockwise direction as viewed in Fig. 2) slot 106 cams pin 105 and member 97 forwardly into retracted or line release position within the confines of channel 90.

Latch means comprising a sear or latch 115 are provided on member 97 to retain the member in its retracted position within flange 86 until the next retrieve or line winding operation. Latch 115 is pivotally mounted within an opening 116 provided in member 97. A looped wire spring 117 fixed at one end in the forward end of member 97 extends rearwardly and has its opposite end overlying the body portion of the latch to normally urge the latch into latching engagement as shown in Fig. 5. The latch engages within a slot 118 provided in plate 91 of flyer 85 at that point where the plate curvedly merges with the annular inner sidewall 89. When the latch is in latched position, as clearly shown in Fig. 5, the lower end thereof projects rearwardly for a slight distance into recess 87 of flyer 85. Upon commencing a retrieve operation, during the first forward stroke of reciprocation of the spool the forward face 68a of its forward flange 68 contacts the latch and releases it from engagement with slot 118 whereupon member 97 is projected rearwardly into line-engaging position as shown in Fig. 4, under the influence of spring 98.

Hence, to effect a reeling-in or retrieve operation, it is merely necessary to turn the crank (and, it will be remembered that the crank can be turned in one direction only because of overriding clutch 39) and to effect line release for casting, it is merely necessary to impart a slight rotative flip to the annular control member. To increase the frictional drag, it is simply necessary to shift the fingertip into contact with the knurled flat portion of housing 60.

Referring to Figs. 1, 2 and 7, it is seen that by the arrangement and construction as described, control member 107 lies forwardly of flyer 85 which lies forwardly of the spool and with a portion of its cylindrical flange 86 forwardly of housing 60. Assuming the rod and reel are grasped by the right hand as shown, with the index finger projecting downwardly say, in the dotted line position "A," following line release rotation of member 107, the same fingertip may be swung arcuately a slight distance rearwardly to position "B" into contact with the exterior surface of wall 86 of flyer 85, there to feather the line between the fingertip and said surface as the looped convolutions pay off from the spool; and if, during the playing of a fish or for any reason, the brake resistance should be desired to be changed, slight further movement arcuately, and a trifle outwardly (see Fig. 7) will bring the tip of the finger to position "C," i. e., into rotative, operative association with the knurled band on housing 60.

With particular reference to Fig. 2 wherein the index finger of the right hand is shown in full lines, the feathering position and operation is somewhat more clearly illustrated. Also from Fig. 2 it will be observed that all of the manipulative operations can as readily be performed with the left index fingertip so that if an angler is left-handed or prefers for some reason to use the reel in that fashion it is as readily adaptable therefor as it is for right-handed operation.

In our previously mentioned application Serial No. 315,276, now Patent No. 2,711,292, the manipulative control means for retracting the pickup member constitutes a bail member mounted for toggle movement forwardly of the flyer and readily accessible for manipulation. While such control is in the main quite satisfactory it lacks certain advantages of the control described herein in that since the toggle fulcrum of the bail randomly lies in different relative radial axes during operation, the manipulation in certain instances involves a "feeling around for" or diversion of the angler's attention to find that projected portion of the bail required to be pushed inwardly to effect pickup pin retraction.

Under the construction herein disclosed this disadvantage is overcome, for the annular control member presents a constantly present and constantly located surface for the fingertip irrespective of the orbital variations of position of the pickup member. In other words the annular control member is universally operable by virtue of its mounting for independent rotatable relative movement with respect to the flyer.

It is obvious that, if desired, the sear or latch member 97 could be mounted upon the annular control member 107 instead of upon the pickup member 118 to effect latching of said pickup member. In this event, of course, the release of the latch would still be under the control of the reciprocatory movement of the spool as described in the foregoing.

It is to be understood that the foregoing is presented as illustrative or exemplary and not as limitative or restrictive and that within the terms of the appended claims various additions, omissions, modifications and substitutions may be made without departing from the spirit or principle of the invention.

We claim:

1. In a fishing reel of the class described; the combination of a gear case having a forwardly projecting support; a driven shaft extending longitudinally through said support; a line-receiving spool rotatably mounted on said support and slidably movable longitudinally therealong; crank operated means for simultaneously driving said shaft and reciprocating said spool; a cylindrical, flanged flyer having a reentrant peripheral channeled portion forming internally thereof a recess for receiving said spool; said flyer being fixed to said shaft forwardly of and adjacent said spool; a pickup member disposed longitudinally within said channeled portion adjacent said spool-receiving recess; spring means normally urging said pickup member from a retracted position within said channeled portion into a projected position overlying the line-receiving portion of said spool; latch means associated with said pickup member operable to latch said member in said retracted position; a fingertip operable annular control member mounted on said flyer forwardly thereof for independent, limited, coplanar rotation relative thereto; said control member being operatively connected to said pickup member to move said pickup member into said retracted position; and a portion of said latch means projecting into said spool recess and being engageable by said spool during its reciprocatory movement to release said latch means from said flyer and thereby permit said pickup member to move into said projected position.

2. In a fishing reel of the class described; the combination of a gear case having a forwardly projecting support; a driven shaft rotatable in one direction only extending longitudinally through said support; a line-receiving spool rotatably mounted on said support and slidably movable therealong; crank operated means for driving said shaft and reciprocating said spool; a cylindrical flanged flyer having a reentrant peripheral channeled portion forming internally thereof a recess for receiving said spool; said flyer being fixed to said shaft forwardly of and adjacent said spool; a pickup member disposed longitudinally for sliding movement within said channeled portion adjacent said spool-receiving recess; spring means normally urging said pickup member into a projected position overlying the line-receiving portion of said spool; latch means operable to latch said member in a retracted position within said channeled portion of said flyer; a digitally operable annular control member mounted on said flyer for independent rotation relative thereto; said control member being operatively connected to said pickup member to move said pickup member into said retracted position; and a portion of said latch means projecting into said spool recess and being engageable by said spool during its reciprocatory movement to disengage said latch means from said flyer.

3. In a fishing reel of the class described; the combination with a case having a forwardly extending support; a shaft rotatable in one direction mounted in said case and extending longitudinally forward through said support; a spool having a line-receiving portion and mounted for independent rotation upon and reciprocatory sliding movement longitudinally of said support; crank operated means for driving said shaft and reciprocating said spool; a cylindrical, flanged flyer fixed to said shaft forwardly of and adjacent to said spool; a line-pickup member supported for sliding movement longitudinally within the flange of said flyer; means normally urging said member rearwardly into a projective, overlying, line-pickup relation with respect to the line-receiving portion of said spool; a manipulative, annular disk member mounted forwardly adjacent said flyer for independent, limited, rotation relative thereto; connections between said disk member and said pickup member operative upon manipulative rotation of said disk member to retract said pickup member into said flange; latch means associated with and effective to latch said pickup member in said retracted position; said latch means having a portion thereof lying in the path traveled by said spool and engageable by the latter during a forward stroke of its reciprocatory movement to release said latch means whereby said pickup member is released into its line-engaging position.

4. The combination as set forth in claim 3 wherein said operative connections between said disk member and said pickup member include said manipulatively rotatable disk member having a slot coacting with an interengaging pin fixed in said pickup member.

5. The combination as set forth in claim 3 wherein said manipulative, annular disk member has its periphery lying flush with the outer periphery of said flanged flyer whereby the fingertip used to impart rotative manipulative movement of said disk member to effect retraction of said line-pickup member may forthwith, following such manipulation, casually and guidedly be slid rearwardly into line-feathering relation with the exterior flange surface of said flyer.

6. In a fishing reel of the class described; the combination of a gear case having a forwardly projecting support; a shaft extending longitudinally from said case through said support and rotatably journalled therein; a tubular crank shaft extending transversely of said shaft and having driving connection therewith to impart rotation thereto; an overriding clutch effective to permit rotation of said driven shaft in one direction only; a crank having a spindle insertable through and detachably connectable with either end of said tubular crank shaft; a line-carrying spool mounted for independent rotation upon said support and longitudinal reciprocation therealong; a driving connection between said crank shaft and said spool for imparting reciprocation thereto; a peripherally flanged flyer fixed to said driven shaft forwardly adjacent said spool; a line-pickup member supported for longitudinal movement within the flange of said flyer; means for yieldingly projecting said pickup member from said flange into line-engaging position over the line-carrying portion of said spool; an annular control member for said pickup member supported forwardly of said flyer for independent, coplanar rotation relative thereto; said pickup member being connected to said control member to be actuated by said rotative movement thereof into a retracted, line-release position within said flange; means associated with said flyer and said pickup member for latching said pickup member in said retracted position; said latch means having a portion thereof so disposed with respect to said spool when said latch means is in its latched position that said portion is engaged by said spool during reciprocatory movement of the latter to effect release of said latch means and permit projection of said pickup member into line-engaging position.

7. In a fishing reel of the class described; the combination of a casing having a forwardly extending support; a shaft extending therethrough; a line-carrying spool mounted on said support for independent rotation thereon and for reciprocal longitudinal movement therealong; crank operated means for driving said shaft in rotation in one direction and simultaneously reciprocating said spool; a flanged flyer fixed to said shaft forwardly of said spool; an annular control member supported forwardly on said flyer for independent, coplanar rotation relative thereto; a pickup member disposed longitudinally within said flange and projectable therefrom into line-pickup position over said spool; means normally urging said pickup member into said projected position; means connecting said pickup member with said control member whereby, upon said independent relative movement of the latter, said pickup member is retracted within said flange; said flyer having an opening therein; latch means associated with said pickup member effective to engage in said opening with a portion of said latch means projecting therethrough to latch said pickup member in retracted position within said flange; said projecting portion of said latch means lying in the path of travel of and being engageable by said spool to release said pickup member into its projected, line-pickup position.

8. In a fishing reel of the class described; the combination of a casing provided with a forwardly projecting support; a slip sleeve keyed thereto for reciprocatory movement longitudinally therealong; a shaft extending from said case through said support and journalled for rotation therein; crank operated means for driving said shaft in one direction only and simultaneously reciprocating said sleeve; a spool mounted for independent rotation on said sleeve intermediate the ends thereof; a ring plate threaded to the forward end of said sleeve as a stop for said spool; a cylindrical, flanged flyer fixed to said shaft forwardly of and adjacent said spool; said flyer having an opening therein; a fingertip manipulatable, annular control member mounted forwardly of said flyer for rotative movement therewith and for independent, coplanar rotative movement relative thereto; a pickup member slidably mounted longitudinally and within the confines of said flange; spring means normally urging said pickup member rearwardly into a line-engaging position overlying said spool; connections between said flyer and said pickup member operative upon the manipulative independent, relative rotation of said control member to retract said pickup member within said flange; latch means associated with said pickup member and coacting with said opening in said flyer to latch said member in retracted position; said latch means having a portion thereof projecting through said flyer opening and engageable by said spool during a forward stroke thereof to release said pickup member to line-engaging position; a cylindrical housing extending forwardly over and spacedly encircling said spool and having a back plate threadably mounted upon the rear end of said sleeve; and friction brake means interposed between said back plate and said spool whereby said housing may be manipulatively threaded upon said sleeve to vary the friction by the same fingertip which manipulates the annular pickup control member.

9. In a spinning reel comprising a gear case; a forwardly projecting support; a sleeve fixed against rotation thereon but reciprocably slidable longitudinally relative thereto; a line-receiving spool rotatably mounted on said sleeve; a driven shaft extending longitudinally through said support; means for driving said shaft in rotation in one direction and reciprocating said sleeve and spool along said support; a cylindrical flyer having a longitudinally disposed, rearwardly projecting, peripheral flange within which said spool is receivable during the forward stroke of its reciprocation; said flyer being fixed to said shaft immediately forwardly of said spool and having a portion of its surface contactable by a fingertip for feathering the line therebetween during casts; a pickup member disposed longitudinally within said flange; spring means associated with said pickup member normally urging the member into a line-pickup position projectively over said spool; an annular control member supported forwardly of said flyer for rotation therewith and for independent, coplanar, fingertip rotation relative thereto; connecting means operatively interconnecting said control member and said pickup member and operable upon said independent rotation of said control member to retract said pickup member to a line-release position within said flange; latch means associated with said pickup member and said flyer and having a portion thereof engageable by a portion of said spool during reciprocatory movement of the latter; said latch means being effective to latch said pickup member in retracted position upon its being moved thereinto and to release said pickup member to line-pickup position upon movement of said spool-engaging portion by said spool.

10. A reel combination in accordance with claim 9 wherein a cylindrical cup-shaped housing having a back plate is threadably mounted upon said sleeve rearwardly of a face of said spool with its cup-shaped portion extending spacedly forwardly therearound; and brake mechanism including a flat frictional spring and washer assembly mounted on said sleeve interposedly between said back plate and said face of said spool whereby said housing may, upon simple fingertip rotation of its cup-shaped portion in either direction upon said sleeve, vary the drag resistance applied upon said spool by said brake mechanism.

11. A reel combination in accordance with claim 10, wherein the exterior peripheral, fingertip-engageable surface portions of said housing, said cylindrical flyer and said annular pickup control member each lie respectively and progressively forwardly of each other and in such corelative planes and proximity to each other as permits of their manipulation by a simple arcuate shifting of a single finger of the same hand which supports the reel and rod to bring the tip of said finger selectively into operational engagement therewith in accordance with the desired operation that is to be performed.

12. A spinning type fishing reel having in combination a gear case having a forwardly extending support, crank and driving means in said case, a sleeve fixed against rotation on but reciprocally drivable longitudinally of said support by said driving means, a spool rotatably mounted relative to said sleeve, a housing threadably mounted on said sleeve and projecting forwardly in spaced relation concentrically about said spool, friction brake means interposed between said spool and said housing, said brake means being adjustably operable by manipulative rotation of said housing.

13. A spinning type fishing reel having in combination a gear case having a forwardly extending support, crank and driving means in said case, a sleeve fixed against rotation on but reciprocally drivable longitudinally of said support by said driving means, a spool rotatably mounted relative to said sleeve, a housing threadably mounted on said sleeve and projecting forwardly in spaced relation concentrically about said spool, friction brake means fixed to said sleeve in interposed relation between said spool and said housing, said brake means being adjustably operable by manipulative rotation of said housing.

14. A spinning type fishing reel having in combination a gear case having a forwardly extending support; crank and driving means in said case; a sleeve fixed against rotation on but reciprocally drivable longitudinally of said support by said driving means; a spool rotatably mounted relative to said sleeve; a housing threadably mounted on said sleeve and projecting forwardly in spaced relation concentrically about said spool; friction brake means fixed to said sleeve in interposed relation between said spool and said housing; said brake means being adjustably operable by manipulative rotation of said housing; a rotatably driven shaft extending longitudinally through said support; a cylindrically flanged flyer disposed forwardly of said spool and housing and fixed to said shaft; a pickup member projectable from and retractable within said flyer into line-pickup and release positions, respectively; an annular, cylindrically flanged control member disposed forwardly of said flyer and operatively connected for rotation therewith and for independent manipulative relative rotation thereto to retract said pickup member in said flyer; the peripheral exterior surfaces of said housing, and the flanges of said flyer and annular control member being in such relative proximity to each other and to the tip of the finger of the reel-grasping hand as to permit their selective independent manipulation by a simple arcuate movement of said fingertip into operative relation therewith.

15. In a fishing reel of the class described; the combination with a case having a forwardly projecting support; a shaft rotatably mounted in said case and projecting forwardly through said support; a spool having a line-receiving portion and mounted for independent rotation upon and reciprocatory movement longitudinally along said support; means for simultaneously reciprocating said spool and driving said shaft; a cylindrical, flanged flyer fixed to said shaft forwardly of and adjacent said spool; a line-pickup member supported for longitudinal movement on said flange and shiftable from a retracted, line-release position into a projected, line-pickup position lying in the plane of the line-receiving portion of said spool; spring means normally urging said pickup member into said projected, line-pickup position; latch means associated with said pickup member and said flyer and having a portion thereof engageable by said spool during its reciprocatory movement; said latch means being operable to retain said pickup member in said retracted, line-release position upon its being moved thereinto and to permit release and shifting of said member into said projected, line-pickup position upon movement being imparted to said spool-engaging portion by said spool; an annular control member mounted forwardly of and adjacent said flyer for rotation therewith and for independent, manipulative, coplanar rotation relative thereto; and means operatively interconnecting said pickup member and said annular control member operable upon said independent, manipulative rotation of said annular control member to shift said pickup member from its projected, line-engaging position into its retracted, line-releasing position.

References Cited in the file of this patent

UNITED STATES PATENTS

| | | |
|---|---|---|
| 2,615,647 | Palmer et al. | Oct. 28, 1947 |
| 2,630,979 | Uerling | Mar. 10, 1953 |
| 2,644,647 | Denison et al. | July 7, 1953 |

FOREIGN PATENTS

| | | |
|---|---|---|
| 922,190 | France | Jan. 27, 1947 |